United States Patent [19]
Mercx

[11] 3,956,256
[45] May 11, 1976

[54] PROCESS FOR POLYMERIZING ETHENE AT HIGH PRESSURE AND TEMPERATURE

[75] Inventor: Frederik J. P. J. Mercx, Stein, Netherlands

[73] Assignee: Stamicarbon B.V., Geleen, Netherlands

[22] Filed: Sept. 12, 1974

[21] Appl. No.: 505,605

[30] Foreign Application Priority Data
Sept. 18, 1973 Netherlands .................... 7312804

[52] U.S. Cl. .................................. 526/64; 23/289; 526/65; 526/88; 526/352
[51] Int. Cl.² ........................ C08F 10/02; B01J 3/04
[58] Field of Search ................ 260/94.9 R, 94.9 P; 23/289

[56] References Cited
UNITED STATES PATENTS

| | | | |
|---|---|---|---|
| 2,763,699 | 9/1956 | Van Dijk et al. ................. | 260/94.9 P |
| 3,692,763 | 9/1972 | Van Saane et al. ............ | 260/94.9 P |
| 3,756,996 | 9/1973 | Pugh et al. ...................... | 260/94.9 R |

*Primary Examiner*—Alan Holler
*Attorney, Agent, or Firm*—Cushman, Darby & Cushman

[57] ABSTRACT

A process and apparatus for the continuous polymerization of ethene at high pressures and temperatures, in the presence of an initiator. Reaction is carried out in a cylindrical autoclave wherein ethene is fed into the autoclave at a high velocity through nozzles having a restricted opening. The nozzles are fitted and mounted on the autoclave in at least two different places at an angle which is acute to the central axis of the autoclave whereby the direction of flow of the ethene coming from the nozzles is substantially parallel and opposite.

15 Claims, 4 Drawing Figures

PROCESS FOR POLYMERIZING ETHENE AT HIGH PRESSURE AND TEMPERATURE

BACKGROUND OF THE INVENTION

This invention relates to an improved process and apparatus for continuously polymerizing ethene both at high pressures and temperatures in a cylindrical autoclave in the presence of an initiator. The ethene is mixed with the contents of the autoclave by feeding the ethene into the autoclave at a high velocity. The polymerization is usually carried out at a pressure of about 500 to 10.000 at and a temperature of about 100° to 400°C.

As described in U.S. Pat. No. 3,692,763, it is known to pass ethene into an autoclave through a feed tube having a restriction therein, such that the pressure of the ethene within the tube is increased and thus the velocity of the ethene is increased as it exists the tube. As a result, ethene which passes tangentially into the autoclave collides, at a high velocity, with the material and mass contained within the autoclave. As a result, the internal mass together with the inflowing ethene is constantly maintained in a whirling, mixing motion due to the transfer of impulses from the inflowing ethene.

The use of such so-called propulsive jets produces a current in the autoclave comparable to conventional autoclaves where mixing is accomplished by means of a stirrer.

Advantages of such a jet method over mechanical mixing are:
a. No maintenance, dismantling, alignment, and assembly of the stirrer is required. Nor is it necessary to replace worn-out bearings, when trouble occurs. As a result, production losses due to maintenance work are lower.
b. No investment costs in stirring equipment (motor, stirrer, etc.), which can amount to about 30 % of the total reactor cost.
c. Enlargement of the effective reactor volume by 10 to 15 %.
d. Elimination of possible hazard due to overheating of a bearing which might give rise to spontaneous decomposition of the ethene.
e. No contamination of the product by metal particles produced by wear of the bearings.

It is the primary object of this invention to improve the mixing of ethene with the autoclave contents.

It is a further object of the present invention to reduce the energy required for polymerizing ethene by suitably arranging the feed nozzles.

SUMMARY OF THE INVENTION

The invention is based on the idea that, in order to effect optimum mixing of the ethene fed in with the autoclave contents, it is not necessary when propulsive jets are used, to achieve the same flow pattern as that which occurs when a conventional stirrer is used. Rather, it has been found that a flow must be created such as will make best use of the property of a jet entering a medium. The jets are arranged so that the volume in the autoclave is engaged in mixing and the loss of impulses is minimum when the free path of the jet is as long as possible.

According to the invention, the ethene is fed into an autoclave at least in two places, at an acute angle to the central axis of the autoclave in such a way that the directions of flow of the two ethene currents are substantially parallel and opposed.

By so arranging the jets the flow path of ethene covers a rather large distance before striking the wall of the autoclave. This is in contrast to a tangential feed, where a considerable part of the energy of the jet is lost, due to collision with and friction incurred along the wall of the autoclave. The pressure drop required to effect a certain impulse according to the invention is, consequently, considerably smaller than when a tangential feed is used. A pressure drop of 60 kg/cm² proves to be amply sufficient. Conventional propulsive-jet mixers make use of a pressure drop of 110–170 kg/cm².

The ethene jets are surrounded on all sides by the medium in the autoclave over a rather large distance, so that the part of the reactor contents participating in the mixing with the ethene fed in its maximum. Experiments have shown that a jet entering the autoclave at the rate of 100 m/sec has sucked in about 10 times its own size within 0.01 sec. This time is relatively short compared with the half-life at the reaction temperature of the initiators used in the high-pressure polymerization, and with the total stay time of the ethene in the polymerization zone. Ethene at a temperature of 30°C which is fed to a reactor having an internal temperature of 200°C, reaches a temperature of 185°C after mixing with 10 times the jet output. Thus, the ethene fed into the reactor is raised to the polymerization temperature in as little a time as 0.01 seconds, leaving sufficient time for the polymerization to take place until all initiator has been consumed.

Since the ethene jets enter at an oblique angle to the central axis of the autoclave, the contents will make a circulating movement in a plane parallel to the central axis of the autoclave. This results in a rapid equalization of temperature in order polymerization. the polymeization process can be controlled better than in prior methods, and the productivity of the initiator is maximized. Furthermore, by feeding ethene as described herein, the central part of the reactor, (now available as reaction space due to the absence of a large stirrer shaft) is involved more effectively in the mixing of the reaction components than with a tangential feed. The autoclave now has no dead corners where the temperature can rise above the permissible limit.

The ethene may be fed into the reactor at two diametrically opposed places in the diametrical bisecting plane of the autoclave, or in two places on either side of this plane. In the latter case, the ethene preferably is fed into the autoclave so that the two ethene flows are directed away from said bisecting plane. The distance from the feed places to this diametrical bisecting plane is preferably one-tenth to one-fourth of the length of the autoclave. In the autoclave three zones can be distinguished, viz. two zones near the end walls of the autoclave, where the contents of the autoclave rotate in the same direction in the plane through the propulsive jets, and, in between these zones, a middle zone where the autoclave contents rotate substantially in the opposed direction in this plane.

The most favorable angle included by the direction of the propulsive jets and the central axis of the autoclave depends on the length/diameter ratio of the autoclave and the place where the ethene is fed in. It is preferred that the ethene be fed in at such a direction that the flow from the jet hits the cylindrical wall at a short distance from the end wall of the autoclave. The angle included by the ethene feed and the cenral axis of the autoclave is between 5°–45°, and preferably from 10°–30°C. The ethene may be fed in through a feed tube protruding through a bore in the wall of the autoclave and ending in a place between the central axis and the autoclave wall. This place may be both close to the wall and in the centre of the autoclave.

The ethene feed may be arranged so that the ethene jet intersects the central axis of the autoclave. In a preferred embodiment, the jet intersects the central axis of the autoclave so that a rotation about this central axis is superimposed on the rotating movement in a plane parallel to the central axis of the autoclave. Such an arrangement promotes the mixing and the rapid equalization of temperature. The rotating movement may also be created by means of a stirrer. However, the construction of this stirrer and the driving mechanism need not be as sturdy as in conventional autoclaves, since the energy required for mixing the reactor contents is substantially supplied by the transfer of impulses by the ethene fed in.

The initiator is preferably fed to the polymerization zones together with the ethene. The temperature at which the polymerization is effected in these zones may be adjusted by the choice of a suitable type and/or amount of the initiator fed in. In this way it is possible to obtain a multiple-zone product without the necessity of mounting partitions to separate the zones in the autoclave.

If desired, ethene and initiator may also be fed into the middle or intermediate zone, so that a third polymerization zone is formed in the autoclave. The feed of ethene to this middle zone prefererably is accomplished by tangential jet so that, in addition to the rotating currents produced by at least the two first ethene flows in a plane parallel to the central axis of the autoclave, another rotating current is formed in a plane perpendicular to said plane.

Polyethylene formed in the autoclave and the unconverted ethene are discharged through a discharge opening provided in one of the end walls of the autoclave reactor. In the zone adjacent the end wall not provided with such a discharge device, polymerization is carried out preferably at a low temperature, e.g. 185°C, in the middle zone at a slightly higher temperature, e.g. 225°C, and in the zone near the end wall provided with the discharge opening for the polyethylene and the unconverted ethene at a still higher temperature, e.g. 265°C. Properties of polyethylene, such as strength, specific gravity, molecular weight distribution, gloss, see-through, etc. depend on the temperature at which the polymerization is carried out. Some of these properties will be improved at a high polymerization temperature and others at a lower polymerization temperature. Thus, it can be readily appreciated that it is advantageous to polymerize the ethene in a number of zones at different temperatures. The amount of polyethene formed in each of the zones can be adjusted by control of the amount of initiator fed in, in accordance with the properties the product is required to have.

BRIEF DESCRIPTION OF THE DRAWINGS

The invention will be elucidated with reference to the embodiment shown in the drawings.

Figure 1:
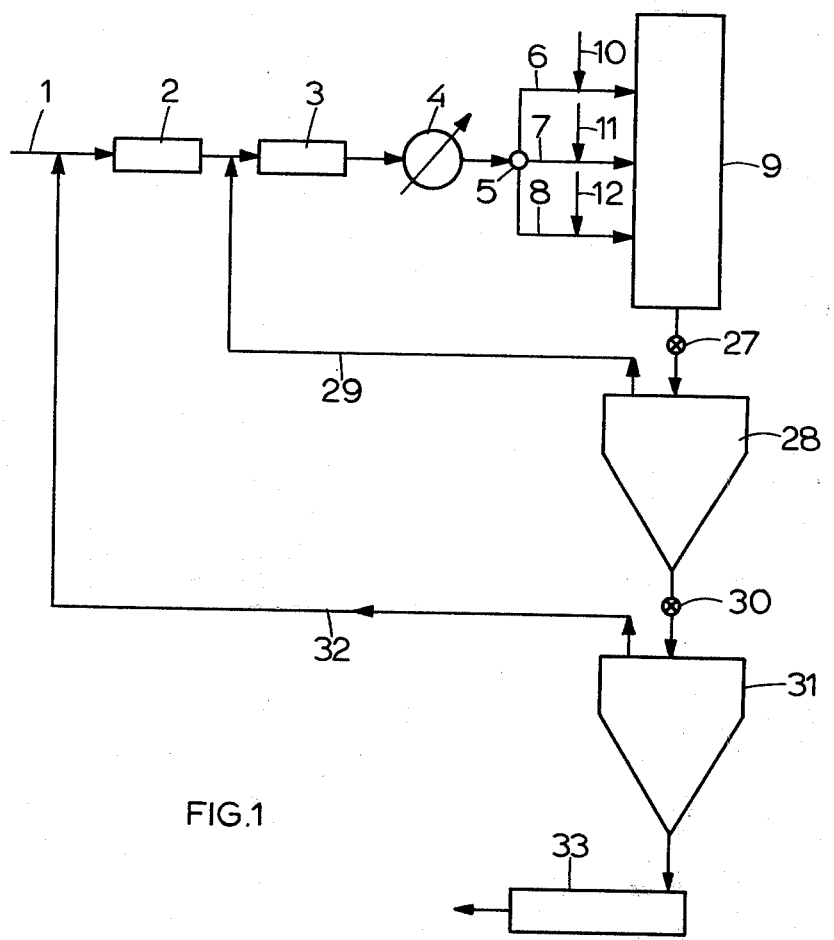
FIG. 1 is a schematic diagram for the high-pressure polymerization of ethene.

Ethene is fed in through conduit 1 and is compressed by means of compressors 2 and 3. The primary compressor 2 raises the pressure of the ethene to, e.g. 250 kg/cm$^2$ and the secondary compressor 3 compresses the ethene further to a pressure of, e.g., 2000 kg/cm$^2$. In cooler 4 the ethene is chilled to the required feed temperature. By means of a distributor valve 5, the compressed ethene is divided into three ethene flow channels 6, 7 and 8, which are connected to a cylindrical autoclave 9 in three different places.

Certainly it is within the scope of this invention that other monomers forming a copolymer with the ethylene may be added to the ethene. Examples of such comonomers are unsaturated esters, such as ethyl acrylate, vinyl acetate or vinyl propionate, unsaturated carboxylic acids, such as acrylic acid, methacrylic acid, etc., alkene compounds, such as propene, butadiene and neohexene, and other unsaturated compounds, such as acrylonitrile and vinyl chloride. Furthermore, molecular-weight regulators, such as hydrogen, propane, butane etc. may be added to the ethene, along with other conventional materials such as stabilizers, antioxidants, antistatics, etc.

Through conduits 10, 11 and 12, an initiator may be added to the ethene flowing in conduits 6, 7 and 8. Initiators that may be used are well known in the art and include oxygen, peroxides, (e.g. diethyl peroxide, di-tert. butyl peroxide, lauroyl peroxide, capryloyl peroxide, tert. butyl perbenzoate, etc.) or compounds of the azo type, azines, and oximes.

The autoclave (FIG. 2) consists of a thick-walled cylinder 13 closed at the top by a cover 14 and at the lower side by a bottom 15. The bottom is provided with a discharge opening 16 for the resulting polymer and the unconverted ethene. The wall of the cylinder must be of sufficient thickness to withstand the high pressures occuring during polymerization.

The wall of the autoclave is provided with bores 17, 18 and 19. Bore 17 is at one-third of the length of the autoclave below the cover and bore 19 at one-third of the length of the autoclave above the bottom. As viewed from the top, bores 17 and 19 are diametrically opposed, while bore 18 is in between these bores (FIG. 3).

The conduits 6, 7 and 8 pass through bores 17, 18 and 19 respectively and end in the autoclave. The end of conduit 6 projecting into the autoclave is fitted with an injection nozzle 20, which slants upwards at an angle of 20° to the central axis of the autoclave. The end of conduit 7 projecting into the autoclave is fitted with a tangential injection nozzle 21, and the end of conduit 8 projecting into the autoclave with an injection nozzle 22, which slants downwards at an angle of 20° to the central axis of the autoclave.

Figure 4:
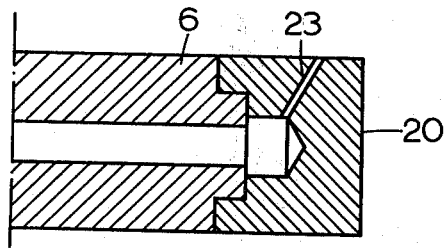
FIG. 4 is a longitudinal section through an ethene-feeding device (i.e. nozzle) on a larger scale.

A drop in pressure occurs in the restricted outlet channel 23 of the injection nozzles (FIG. 4), which causes the ethene to flow out at a high velocity. The impulse thus imparted to the contents of the autoclave produces circulation flows in the upper zone 24 and lower zone 26 of the autoclave, and these flows rotate in the same direction in the vertical plane, as indicated by arrows in FIG. 2. In the middle zone 25 between these zones, a rotary flow in the opposite direction occurs in this plane. When ethene is fed in tangentially through nozzle 21, a rotary flow is also produced in the middle zone in a plane perpendicular to the central axis of the autoclave.

Figures 2, 3:
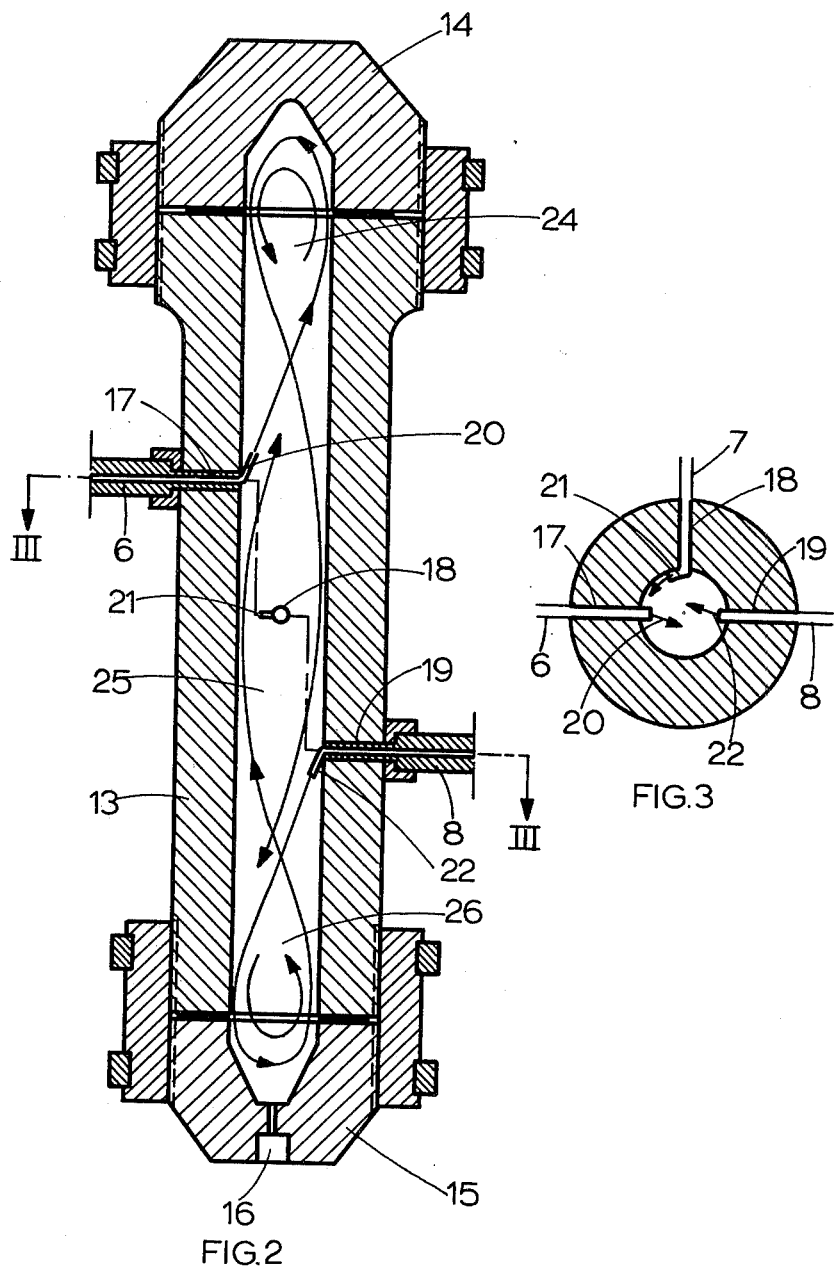
FIG. 2 is a longitudinal section through the autoclave used.
FIG. 3 is a cross-section through the autoclave according to the line III—III in FIG. 2.

Injection nozzles 20 and 22 are preferably so mounted that they cross the central axis of the autoclave, as shown in FIG. 3. As a result rotary flows, in a plane perpendicular to the central axis of the autoclave, are produced in zones 24 and 26, in addition to the rotary flow in a vertical plane, the direction of these rotary flows being preferably the same as that of the rotary flow produced in the middle zone 25 by injection nozzle 21.

The flows described above produce intensive mixing of the ethene fed in and the contents of the autoclave whereby the ethene feed quickly reaches the reaction temperature. On the other hand, the entire contents of the autoclave are soon subjected to the cooling action of the ethene fed in, so that the temperature in the autoclave does not exceed the maximum admissible value in any place, (i.e. about 450°C), which is also due to the absence of dead corners at the prevalent flow pattern.

An equal amount of ethene can be fed in through each of the feed nozzles. However, by suitable control of the distributor valve 5, these amounts may also differ and be adjusted to the volume of that part of the autoclave which, in the first instance, is covered by the ethene jets from the injection nozzles. The temperature in the zones 24, 25 and 26 is preferably adjusted to different values, so that a polymer with a wide molecular-weight distribution is obtained. To this end, the amount of initiator fed to each of the zones is adjusted in the right way. The amount of initiator is small in comparison with the amount of ethene fed into the autoclave and amounts to from about 0.001 to 5 moles % based on the ethene fed into the reactor. The exact amount depends on the type of initiator and the desired reaction temperature. As more initiator is fed in, more ethene will be converted, so that the temperature rises accordingly as a result of the exothermic polymerization reaction.

The average time the ethene remains in the autoclave is comparatively short (about 30 sec.), so that initiators with a short half-life must be used. In the high-pressure polymerization of ethene use is generally made of initiators having a half-life of 0.05–1.5 sec. at the temperature prevailing in the reaction zone. If the half-life of the initiator is longer, some will leave the reactor unused, whereas, at a shorter half-life, the initiator will decompose too soon.

In the embodiment described a temperature of 185°C is maintained in zone 24, and lauroyl peroxide with a half-life of below 0.5 sec, at this temperature is used as initiator. In the middle zone 25, a temperature of 225°C is maintained, while tert. butyl-peroxydiethyl acetate with a half-life of below 0.5 sec at this temperature is used, and in zone 26 a temperature of 265°C is maintained, while di-tert. butylperoxide with half-life of about 0.5 sec at this temperature is used. The initiators are added to the ethene feed as a solution or suspension in a suitable diluent.

The pressure in the autoclave is equal to the final pressure of the secondary compressor less the loss of pressure in the feed conduits and the pressure drop in the feed nozzles, and amounts to about 1950 kg/cm$^2$ in the embodiment described. However, other pressures, both higher and lower may be employed.

The polyethylene formed in the autoclave, together with an amount of unconverted ethene, is discharged through an opening 16 in the bottom of the autoclave and flows through an expansion valve 27 into a high-pressure separator 28. The pressure in this separator is about 250 kg/cm$^2$. The separated ethene is returned to the inlet of the secondary compressor through conduit 29, while the separated polyethylene is passed to a low-pressure separator 31 through a valve 30. The pressure in the latter separator is about 1 atm, so that ethene which remains dissolved in the polyethylene is separated off, after which it is returned to the inlet of the primary compressor through conduit 32. The polyethylene discharged from separator 31 is processed into granules by means of a granulator 33.

The following example is provided to more fully illustrate the invention, but is not to be construed as limiting the scope thereof.

EXAMPLE

A vertically arranged autoclave with an internal diameter of 10 cm and an internal height of 100 cm (contents about 8 liters) was fed with ethene and 2.5 moles % of propane and a small amount of initiator at three places, viz. 100 kg/h at a place 35 cm below the cover in the upward direction at an angle of 15° to the vertical, 50 kg/h in the middle of the autoclave in a tangential direction, and 100 kg/h in a place 35 cm above the bottom in the downward direction at an angle of 15° to the vertical. After being raised to a pressure of 2000 kg/cm$^2$ by means of compressors, the ethene was fed in at a temperature of 65°C through conduits having an internal diameter of 5 mm and ending in the autoclave by means of injection nozzles with a smallest diameter of 1 mm. The loss of pressure in the feed conduits was 10 kg/cm$^2$, while a pressure drop of 40 kg/cm$^2$ occurred in the injection nozzles, which was converted into speed, so that the pressure in the autoclave was 1950 kg/cm$^2$.

An amount of lauroyl peroxide corresponding to 0.40 kg per ton of polyethylene produced was added to the upper ethene feed, an amount of tert. butylperoxydiethyl acetate corresponding to 0.09 kg per ton of polyethylene produced to the middle ethene feed, and an amount of di-tert. butyl peroxide corresponding to 0.03 kg per ton of polyethylene produced to the lower ethene feed. The temperatures then prevailing in the autoclaves were 185°C in the upper zone, 225°C in the middle zone, and 265°C in the lower zone. 37 kg/h of polyethylene and 213 kg/h of ethene were discharged through an opening in the botton of the autoclave.

The polyethylene freed from this mixture by means of separators had a specific gravity of 0.925 kg/dm$^3$ and a melt index of 1.5 g/10 min. A film prepared from this polyethylene had a gloss of 60 0/∞ (ASTM-D 523-53 T), a see-through of 22 (EEL), and an opacity of 7.7 % (ASTM D 100361).

The invention in its broader aspects is not limited to the specific details shown and described, but departures may be made from such details within the scope of the accompanying claims without departing from the principles of the invention.

What is claimed is:

1. In a process for the continuous polymerization of ethene at high pressure and temperature in a cylindrical autoclave in the presence of an initiator which comprises feeding ethene into the autoclave at a high velocity, the improvement which comprises:

feeding the ethene into the autoclave in at least two places, at an angle which is acute to the central axis of said autoclave such that the directions of flow of the ethene currents at said places are substantially parallel and opposite.

2. A process according to claim 1, wherein ethene is fed into the autoclave at two places on either side of the bisecting plane perpendicular to said central axis of the autoclave, the directions of ethene flow being away from said plane.

3. A process according to claim 2, wherein the ethene is fed into the autoclave at places that are at one-tenth to one-fourth of the length of the autoclave from said bisecting plane.

4. A process according to claim 1, wherein the angle included by the direction of the ethene feed and the central axis of the autoclave is between about 5° and 45°.

5. A process according to claim 4, wherein said angle is between about 10° and 30°.

6. A process according to claim 1, wherein the ethene is fed into the autoclave such that the direction of ethene flow crosses the central axis of the autoclave.

7. A process according to claim 1, wherein ethene is also fed tangentially into the autoclave at a place between said two places.

8. An apparatus suitable for reacting and continuously polymerizing ethene at high temperatures and pressures in the presence of an initiator which comprises:
   a. a cylindrical autoclave having thick-walls, and
   b. at last two restricted feed nozzles mounted on and directed into said autoclave at an acute angle to the central axis of said autoclave, the directions of the nozzles being both parallel and opposite.

9. The apparatus of claim 8, wherein said nozzles are fitted on either side of the bisecting plane perpendicular to said central axis of the autoclave.

10. The apparatus of claim 9, wherein said nozzles are at one-tenth to one-fourth of the length of the autoclave from said bisecting plane.

11. The apparatus of claim 8, wherein said nozzles are mounted at an angle of between about 5°–45° to the central axis of the autoclave.

12. The apparatus of claim 11, wherein said nozzles are mounted at an angle between about 10°–30°.

13. The apparatus of claim 8, wherein said nozzles are arranged so that the central axis of the nozzles crosses the central axis of the autoclave.

14. The apparatus of claim 8, further comprising a tangential nozzle fitted and mounted between said nozzles mounted at an angle to the central axis of the autoclave.

15. The apparatus of claim 8, further comprising a stirring mechanism mounted in the autoclave for making the autoclave contents rotate about the central axis.

* * * * *